(12) United States Patent  (10) Patent No.: US 8,297,929 B2
Steffensen  (45) Date of Patent: Oct. 30, 2012

(54) REINFORCED BEARING FOR A WIND-POWER GENERATOR BLADE

(75) Inventor: Ulrik Steffensen, Silkeborg (DK)

(73) Assignee: Gamesa Innovation & Technology, S.L., Sarriguren (ES)

( * ) Notice: Subject to any disclaimer, the term of this patent is extended or adjusted under 35 U.S.C. 154(b) by 780 days.

(21) Appl. No.: 12/513,746

(22) PCT Filed: Nov. 13, 2007

(86) PCT No.: PCT/ES2007/000648
§ 371 (c)(1),
(2), (4) Date: May 6, 2009

(87) PCT Pub. No.: WO2008/059089
PCT Pub. Date: May 22, 2008

(65) Prior Publication Data
US 2009/0311104 A1 Dec. 17, 2009

(30) Foreign Application Priority Data
Nov. 13, 2006 (ES) .................................. 200602873

(51) Int. Cl.
*F03B 3/14* (2006.01)
(52) U.S. Cl. .................................... 416/147; 416/204 R
(58) Field of Classification Search .................. 416/147, 416/210 R, 204 R
See application file for complete search history.

(56) References Cited

U.S. PATENT DOCUMENTS
2005/0254949 A1 11/2005 Schubert et al.

FOREIGN PATENT DOCUMENTS
| | | |
|---|---|---|
| DE | 3725972 A1 | 2/1989 |
| ES | 2223787 T3 | 3/2005 |
| WO | WO 2007003866 A1 * | 1/2007 |

* cited by examiner

*Primary Examiner* — Dwayne J White
(74) *Attorney, Agent, or Firm* — Ladas & Parry LLP

(57) ABSTRACT

Mounting arrangement of the blades on the hub (5) of a wind power turbine comprising a bearing (11) between each blade root (13) and the corresponding hub connection (15) having an inner ring (25) and an outer ring (23) with a stiffening plate (33) attached at least on a part of the outer ring (23), preferably in a perpendicular plane to the blade axis, on the opposed side (29) to the side (37) joined to the hub connection (15).

10 Claims, 2 Drawing Sheets

REINFORCED BEARING FOR A WIND-POWER GENERATOR BLADE

FIELD OF THE INVENTION

This invention relates to a wind turbine and in particular to the mounting arrangement of the blades on the hub of the wind turbine.

BACKGROUND

In the known art, the mounting arrangement of the blades on the hub of a wind turbine is generally based on ball or rolling bearings for the transmission of the involved axial forces and flexural moments.

Said axial forces and flexural moments depend on many factors and in particular the features and dimension of the blades, the wind velocity and the pitch system used for regulating the pitch of the blades.

U.S. Pat. No. 6,799,947 B2 discloses a bearing for an adjustable rotor blade for a wind turbine having an axial-type pitch system comprising a bearing race for the one co-operating bearing component, which bearing race receives in positively locking relationship two radially mutually displaced rows of rolling bodies, and a bearing race for the other co-operating bearing component, which embraces them in a U-shape in cross-section, wherein the bearing race for the rotor blade forming the other co-operating bearing component comprises two rings of different diameters which are fixed independently of each other to the rotor blade. That arrangement affords on the one hand a practically three-race rolling bearing whose central race which is secured to the other co-operating bearing component, upon the occurrence of flexural moments (and axial forces) receives from the two outer races (or race portions of the embracing bearing race) pressure forces in directions which extend more or less perpendicularly to each other and which are thereby automatically rendered symmetrical, and the pressure forces therefore respectively remain in the central region of the bearing raceway quadrants, while on the other hand the forces from the rotor blade are simultaneously applied to the two outer races (or race portions) and this therefore provides for more uniform loading of the mounting and the rotor blade root.

In wind turbines having pitch control systems based on lineal actuators such as the system disclosed in EP 1 126 163 A1 the blade bearings are generally single or double race bearings such as the illustrated in particular in FIG. 1 of said document. The outer ring of these bearings can have a large deflection and thereby a poor load distribution. This invention is intended to solve this drawback.

SUMMARY OF THE INVENTION

An object of the present invention is to provide a reinforced blade bearing for a wind power turbine.

Another object of the present invention is to provide a blade bearing for a wind power turbine improving the load distribution on the two bearing raceways.

These and other objects of the present invention are met by providing a mounting arrangement of the blades on the hub of a wind power turbine comprising a bearing between each blade root and the corresponding hub connection having an outer ring, an inner ring and a stiffening plate attached at least on a part of the outer ring on the opposed side to the side joined to the hub connection.

Preferably the stiffening plate is placed in a perpendicular plane to the blade axis.

Preferably, the stiffening plate is attached to the outer ring along the half outer ring oriented towards the wind.

One advantage of this invention is that said stiffening plate improves the load distribution on the two raceways equalizing the stiffness of their upper and lower surfaces.

Other features and advantages of the present invention will be understood from the following detailed description of an illustrative and by no means limiting embodiment of its object in relation with the enclosed drawings.

DETAILED DESCRIPTION OF PREFERRED EMBODIMENTS

Figure 1:
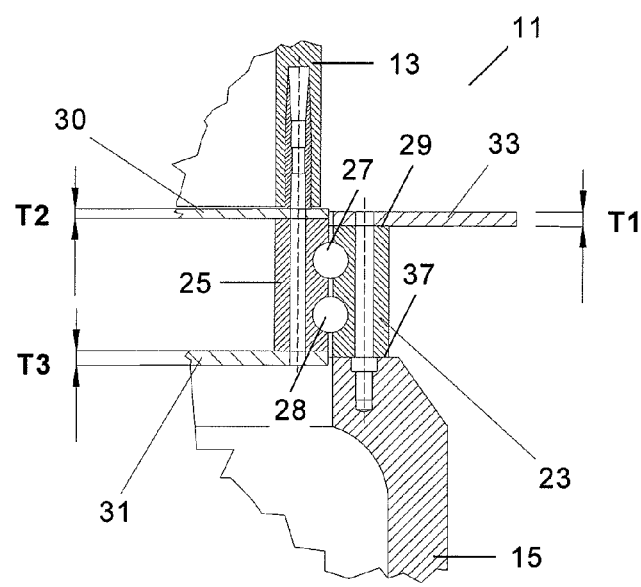
FIG. 1 is a section side view of the reinforced bearing used in the mounting arrangement of a blade on the hub of a wind power turbine according to this invention.

A known mounting arrangement of the blades on the hub 5 of a wind turbine having a pitch control system with linear actuators for each blade uses a bearing 11 between each blade root 13 and the corresponding hub connection 15 comprising an outer ring 23 joined to the hub connection 15, an inner ring 25, with reinforcing plates 30, 31 of thickness T2 and T3 for minimizing its deflection, and upper and lower rows 27, 28 of rolling bodies.

According to the invention, a stiffening plate 33 of thickness T1 is attached to the outer ring 23 on the upper surface 29, opposed to the lower surface 37 joined to the hub connection 15. In the upper surface 29, the bearing 11 works in tension and the outer ring 23 tend to have a large deflection and thereby a poor load distribution.

The stiffening plate 33, placed in a perpendicular plane to the blade axis in a preferred embodiment of this invention, reinforces the upper surface 29 of the outer ring 23 and improves the load distribution between the two bearing raceways 27, 28 equalizing the stiffness of their upper and lower surfaces.

The present invention is applicable to both rolling bearings and ball bearings.

The stiffening plate 33 may be attached to the outer ring 23 along its full perimeter or along part of it. In any case, the portion of larger width W shall be a portion located on the outer ring 23 side oriented towards the wind (arrow 39 in FIG. 3)

Figure 2:
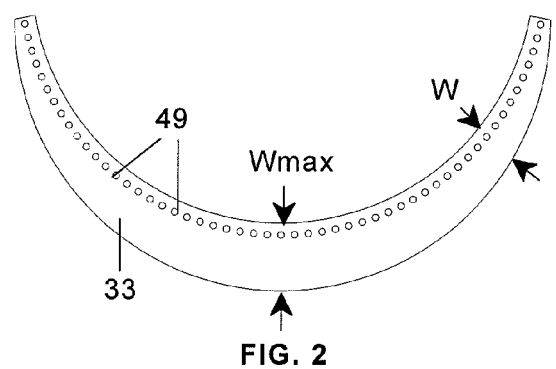
FIG. 2 is a plan view of a stiffening plate used in the reinforced bearing according to this invention.
Figure 3:
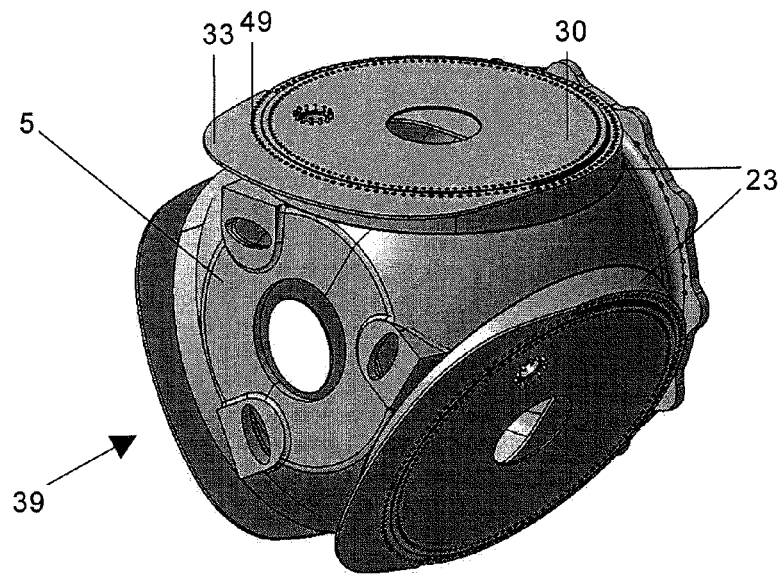
FIG. 3 is a perspective view of the mounting arrangement of a blade on the hub of a wind power turbine according to this invention.

In a preferred embodiment, shown in FIGS. 2 and 3, the stiffening plate 33 is positioned in the hub connection 15 side oriented to the wind (arrow 39 in FIG. 3). Is in this side where tension forces appear (the flap-moment on the bearing creates tension forces at the wind side of the hub and compression forces at the nacelle side of the hub). The stiffening plate 33 is attached to the outer ring 23 in a sector close to 180°.

The width of the stiffening plate 33 is variable along its length in a proportional relation to the tension to be supported. In the preferred embodiment, shown in FIG. 2, the stiffening plate 33 has its maximum width value Wmax along an hypothetical outer ring (23) diametral axis parallel to the rotor axis and a symmetrical decreasing width W towards both sides of said diametral axis.

In a preferred embodiment, particularly from a constructive point of view, the stiffening plate 33 is attached to the outer ring 23 along its full perimeter.

In a preferred embodiment, the stiffening plate 33 includes a plurality of holes 49 to facilitate its attachment to the upper surface 29 of the outer ring 23 with bolts or similar means.

In a preferred embodiment, the stiffening plate is made in steel and it is dimensioned for minimizing the deflection and improving the load distribution in the bearing.

Figure 4A:
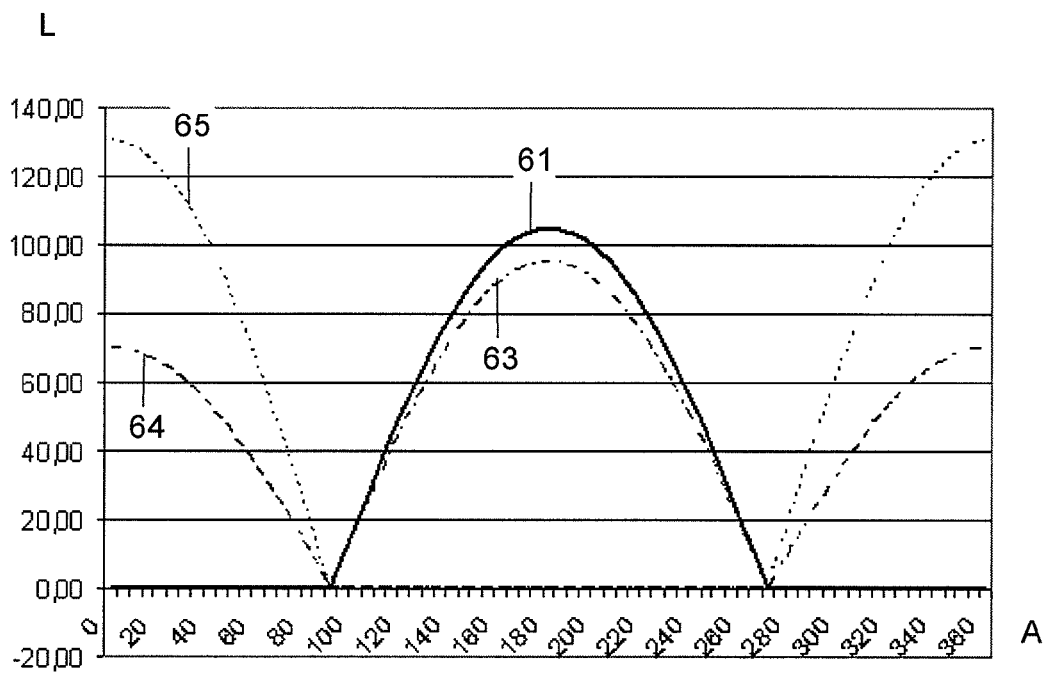
FIGS. 4b and 4a show, respectively, the distribution of forces in the bearing with and without the stiffening plate according to this invention.
Figure 4B:
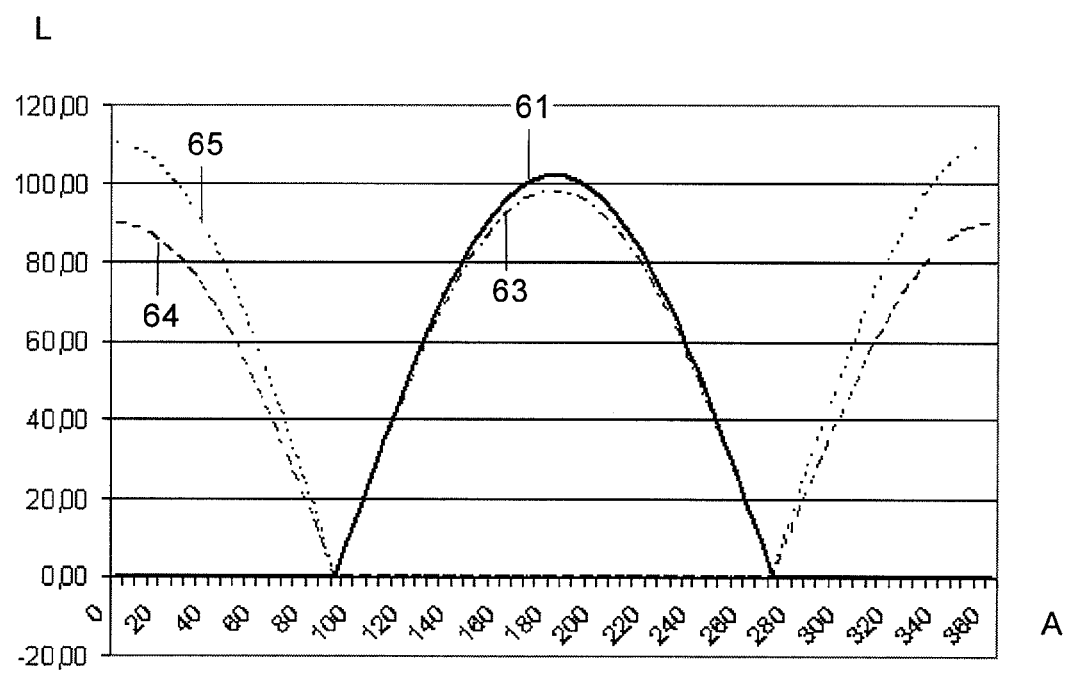

The load distribution with and without the stiffening plate is illustrated in the graphs (Angle A in x-axis, Load L in y-axis) included in FIGS. 4b and 4a: Tension 64 in upper row 27, Compression 61 in upper row 27, Tension 65 in lower row 28, Compression 63 in lower row 28.

Although the present invention has been fully described in connection with preferred embodiments, it is evident that modifications may be introduced within the scope thereof, not considering this as limited by these embodiments, but by the contents of the following claims.

The invention claimed is:

1. A mounting arrangement of blades on a hub (5) of a wind power turbine comprising a bearing (11) between each blade root (13) and a corresponding hub connection (15) having an outer ring (23) and an inner ring (25), wherein said inner ring (25) has reinforcing plates (30, 31) of thickness T2 and T3 for minimizing its deflection, and said arrangement further comprises a stiffening plate (33) of thickness T1 attached at least on a part of the outer ring (23) on a side (29) opposed to a side (37) joined to the hub connection (15) so that the stiffness of the upper and lower surfaces of the bearing (11) is equalized.

2. The mounting arrangement of the blades on the hub (5) of a wind power turbine according to claim 1, wherein said stiffening plate (33) is placed in a perpendicular plane to the blade axis.

3. The mounting arrangement of the blades on the hub (5) of a wind power turbine according to claim 1, wherein the stiffening plate (33) is attached to the outer ring (23) along the half outer ring (23) perimeter oriented towards the wind.

4. The mounting arrangement of the blades on the hub (5) of a wind power turbine according to claim 3, wherein the stiffening plate (33) width W is variable along its length.

5. The mounting arrangement of the blades on the hub (5) of a wind power turbine according to claim 4, wherein the stiffening plate (33) has its maximum width value Wmax along a hypothetical outer ring (23) diametral axis parallel to the rotor axis and a symmetrical decreasing width W towards both sides of said diametral axis.

6. The mounting arrangement of the blades on the hub (5) of a wind power turbine according to claim 1, wherein the stiffening plate (33) is attached to the outer ring (23) along its full perimeter.

7. The mounting arrangement of the blades on the hub (5) of a wind power turbine according to claim 6, wherein the stiffening plate (33) portion of larger width W is a portion located on the half outer ring (23) oriented towards the wind.

8. The mounting arrangement of the blades on the hub (5) of a wind power turbine according to claim 1, wherein the stiffening plate (33) includes a plurality of bolt-holes (49) for its attachment to the outer ring (23).

9. The mounting arrangement of the blades on the hub (5) of a wind power turbine according to claim 1, wherein the bearing (11) between each blade root (13) and the corresponding hub connection (15) is a rolling bearing.

10. The mounting arrangement of the blades on the hub (5) of a wind power turbine according to claim 1, wherein the bearing (11) between each blade root (13) and the corresponding hub connection (15) is a ball bearing.

* * * * *